(No Model.)
J. AUSTIN.
CORNER FOR BOXES.
No. 486,844. Patented Nov. 29, 1892.
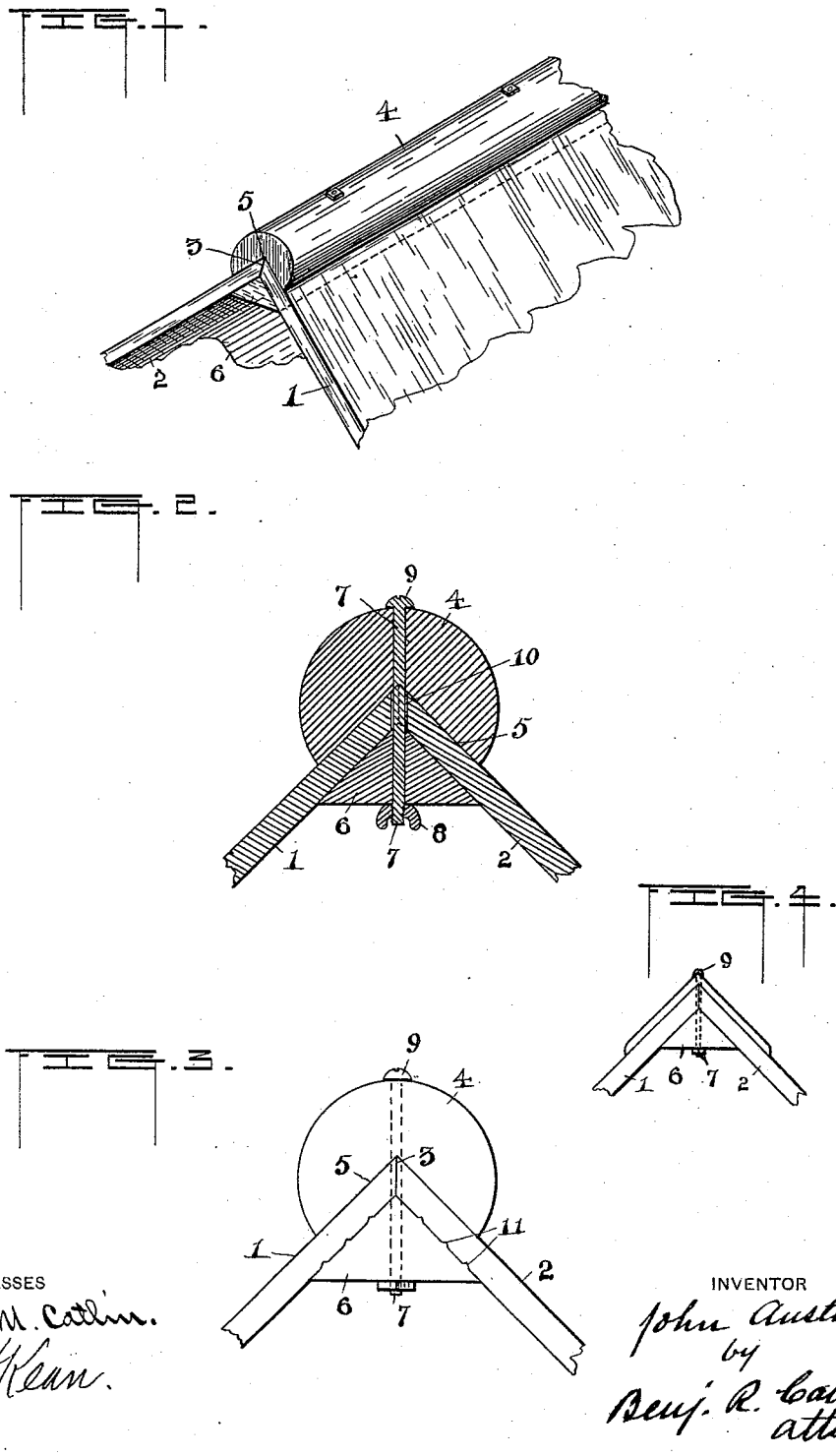
WITNESSES
INVENTOR
John Austin
by Benj. R. Catlin
atty.
THE NORRIS PETERS CO., PHOTO-LITHO., WASHINGTON, D. C.

United States Patent Office.

JOHN AUSTIN, OF BURLINGTON, IOWA.

CORNER FOR BOXES.

SPECIFICATION forming part of Letters Patent No. 486,844, dated November 29, 1892.

Application filed April 4, 1892. Serial No. 427,601. (No model.)

*To all whom it may concern:*

Be it known that I, JOHN AUSTIN, a resident of Burlington, in the county of Des Moines and State of Iowa, have invented certain new and useful Improvements in Corners for Boxes; and I do hereby declare the following to be a full, clear, and exact description of the invention, such as will enable others skilled in the art to which it pertains to make and use the same.

The invention relates to what are styled "knockdown boxes," and has for its object to provide a strong and easily-manipulated fastening for the corners of such boxes and for like articles; and it consists in the construction hereinafter described and pointed out.

In the accompanying drawings, Figure 1 is a view of the improved corner. Fig. 2 is a section of a box-corner with the improved fastening. Figs. 3 and 4 are each a plan of modifications.

Numerals 1 and 2 denote the adjacent sides of a box. Each of these is beveled at 3, as indicated. In the present instance the bevel is at an angle of forty-five degrees, suitable for a rectangular box; but the improvement is not limited to such boxes.

An exterior ornamental corner-piece is denoted by 4. This may have a rounded contour, as shown, or any other that may be desirable. An angular piece is cut out of this corner, so as to leave a re-entrant angle or recess 5, which in the present instance equals ninety degrees.

An inner corner-piece adapted to fit the angle between the sides of the box is denoted by 6. This piece may be sawed out of the part 4 to leave the angular space 5, or it may be made of distinct material.

In all cases the exterior angle of piece 6, the interior angle of the box, and the angle 5 will be equal. These several parts being assembled, as indicated, are drawn together and fastened by bolt 7, having thumb-nut or other suitable device 8 on the interior, though this situation is not essential.

9 indicates the head of the bolt, which may be of ornamental design, if desired, or it may be countersunk. Any desired number of securing-bolts may be used, but for ordinary uses two will suffice.

The abutting bevel-surfaces of the box sides are suitably grooved at 10 to provide passage for the bolt and in such manner as not to interfere with the close contact of the bevel-surfaces.

In operation the parts are assembled as represented. Upon screwing up the thumb-nuts the external and internal corner-pieces are drawn together with the effect to crowd the bevel-surfaces of the box sides together into the angle 5.

The improvement is applicable to wooden boxes and to all like structures wherein it is desirable to secure the sides together in manner to permit the structure to be readily knocked down and subsequently rebuilt.

In Fig. 4 is exhibited a form of the improvement suitable for iron angle-pieces, which may be preferred in some cases, and especially when the size of an external wooden corner-piece would be objectional. If desired, projecting points or ribs 11 may be provided on the inner corner-piece to engage a side and hold it in the angle, as shown in Fig. 3.

I am aware that exterior and interior corner pieces and bolts have been used to secure the sides of a trunk together, and such device is not broadly of my invention, which is characterized by an inner corner-piece fitting the sides which have no transverse grooves or cuts and filling the angle between said sides. They are thereby adapted when the parts are bolted together to draw the sides by friction into the angle, and also adapted to support them against external violence, and for the further protection of the article both corner-pieces are extended along the sides a distance considerably greater than the thickness of said sides.

I am also aware that trunks have been provided with a corner-buffer having a bolt fixed thereto adapted to engage a triangular piece inside the corner, an elastic washer being interposed between the buffer and the trunk and provision being made for both longitudinal and lateral motion of the parts.

Having thus described my invention, what I claim, and desire to secure by Letters Patent, is—

The sides 1, having beveled ends, in combination with the external corner-piece having the angular recess, the internal corner-piece, and the bolt for drawing the parts together, said beveled ends abutting against each other and provided with grooves in their beveled faces for the passage of the bolt, and the inner corner-piece fitting the sides and filling the angle between them and extending vertically substantially the whole width of the sides, whereby said sides are adapted to be moved into the angle of the external corner-piece by friction of said inner corner-piece and are laterally supported against external pressure or blows, both corner-pieces bearing against the sides opposite each other for a distance greater than the thickness of the sides, substantially as set forth.

In testimony whereof I have signed this specification in the presence of two subscribing witnesses.

JOHN AUSTIN.

Witnesses:
ROBERT ALLEN,
W. G. HENNEBERG.